(12) United States Patent
Maki-Ontto et al.

(10) Patent No.: US 10,851,834 B2
(45) Date of Patent: Dec. 1, 2020

(54) COMPENSATION WINDINGS FOR MAGNETIC BEARINGS

(71) Applicant: Ingersoll-Rand Company, Davidson, NC (US)

(72) Inventors: Petri Juhani Maki-Ontto, Espoo (FI); Lauri Juhani Salmia, Vantaa (FI)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 700 days.

(21) Appl. No.: 15/162,243

(22) Filed: May 23, 2016

(65) Prior Publication Data

US 2017/0335889 A1 Nov. 23, 2017

(51) Int. Cl.
*F16C 32/04* (2006.01)
*H02K 7/09* (2006.01)

(52) U.S. Cl.
CPC ...... *F16C 32/0461* (2013.01); *F16C 32/0446* (2013.01); *F16C 32/0463* (2013.01); *F16C 32/0476* (2013.01); *H02K 7/09* (2013.01)

(58) Field of Classification Search
CPC .............. F16C 32/0446; F16C 32/0461; F16C 32/0463; F16C 32/0476; H02K 7/09
USPC .................................. 310/90.5, 51
See application file for complete search history.

(56) References Cited

U.S. PATENT DOCUMENTS

| | | | | |
|---|---|---|---|---|
| 5,084,644 A | * | 1/1992 | Harris | F16C 32/0476 310/90.5 |
| 7,635,937 B2 | | 12/2009 | Brunet et al. | |
| 2007/0164627 A1 | * | 7/2007 | Brunet | F16C 32/0459 310/90.5 |

FOREIGN PATENT DOCUMENTS

| | | | |
|---|---|---|---|
| DE | 824231 | * 12/1951 | |
| DE | 824231 C | 12/1951 | |
| DE | 923704 C | 2/1955 | |
| DE | 2355104 A1 | 5/1975 | |
| DE | 102010013675 A1 | * 10/2011 | .......... F16C 32/0461 |
| JP | S5854221 B2 | * 12/1983 | |

OTHER PUBLICATIONS

Extended European Search Report, European Patent Application No. 17172570.8, dated Oct. 12, 2017, 10 pages.

* cited by examiner

*Primary Examiner* — Tulsidas C Patel
*Assistant Examiner* — Ahmed Elnakib
(74) *Attorney, Agent, or Firm* — Taft Stettinius & Hollister LLP

(57) ABSTRACT

Axial magnetic bearings that include a primary winding(s) and one or more compensation windings that provide compensation such that operation of the first and/or second primary windings and the compensation windings results in a net magneto-motive force of around zero ampere turns. Current can selectively flow through one or both of the primary windings of an opposing pair of axial magnetic bearings, while current flows through the compensation windings in manner that compensates for the magneto-motive force generated by the primary winding(s). In at least situations in which the number of turns for at least one pair of compensation windings is generally equal to the number of turns of each primary winding, the net magneto-motive force generated by current flowing through a primary winding of one axial magnetic bearing and through the compensation windings of both axial magnetic bearings can generally be zero.

9 Claims, 7 Drawing Sheets

COMPENSATION WINDINGS FOR MAGNETIC BEARINGS

BACKGROUND

Embodiments of the present application generally relate to thrust or axial active magnetic bearings or actuators. More particularly, but not exclusively, embodiments of the present application relate to compensation windings for axial magnetic bearings that are adapted to at least attempt to minimize homopolar leakage of magnetic flux.

Magnetic bearing systems may utilize magnetism to at least levitate and/or support a rotable device or apparatus, such as, for example, a rotor, shaft, and/or disk of an electrical motor or generator, among other devices. Additionally, certain magnetic bearing systems can include active thrust or axial magnetic bearings or actuators that provide axial support for the rotatable device or component. Typically, active axial magnetic bearing pulling levitated apparatus to one direction utilize the flow of an electrical current in one, and only one, direction through electromagnetic coils or windings of the axial magnetic bearings to generate a magnetic field that, according to Ampere's circuital law, circles the electrical current. The associated generated thrust force often is associated with an axially induced magnetic field in an air-gap between the relatively stationary axial magnetic bearing and the levitated rotable device. Such a thrust force, which is often referred to as a reluctance force, is often generally directly proportional to the air-gap cross-sectional area and to the second power of the air-gap magnetic flux density.

When electrical current is flowing in only one direction through the electromagnetic coils or windings, the associated magnetic flux may also generally flow in only one direction, which can be referred to as a homopolar magnetic flux, along a main magnetic flux path. For example, FIG. 1 illustrates first and second axial magnetic bearings 100a, 100b positioned on opposing sides of a portion of a rotable device 102, such as, for example, a thrust disk. FIG. 1 further illustrates a generally ideal scenario in which all of the magnetic flux 104 (represented by solid lines) generated by operation of the first axial magnetic bearing 100a flows along a main magnetic flux path 106, with external thrust force being illustrated towards the right direction and bearing thrust force towards left direction. As shown, in such a situation, the main magnetic flux path 106 can extend from a stator ferromagnetic core 108 of the first axial magnetic bearing 100a to a first portion 110a of an air-gap 112 between the first axial magnetic bearing 100a and the rotable device 102, and then to a portion of the rotable device 102, such as, for example, a thrust disk. The main magnetic flux path 106 can then extend, via a second portion 110b of the air-gap 112, back to the stator ferromagnetic core 108 of the first axial magnetic bearing 100a.

However, it is typically practically challenging, if not impossible, to keep all of the magnetic flux only in the main magnetic flux path. Moreover, typically, at least some of the magnetic flux, which may be referred to as leakage flux, flows outside of the main magnetic flux path. The degree of leakage flux present can depend, at least in part, on the magnetic saturation level of the main magnetic flux path, as well as the surrounding parts and materials near the axial magnetic bearing or actuator. Further, while such leakage flux typically is generally useless from a force generation standpoint, leakage flux can consume at least a portion of the total magneto-motive force that generates the magnetic field. Thus, leakage flux can reduce the load capacity of the axial magnetic bearing, while also increasing the total inductance of the axial magnetic bearing, which can reduce the dynamical capacity of the axial magnetic bearing.

Homopolar leakage flux can also cause electromagnetic interference for other electromagnetic components or devices of an apparatus or system. Moreover, axial magnetic bearings are typically positioned in relative close proximity to other components or devices of an apparatus or system, such as, for example, in relatively close proximity to other actuators and/or sensors. Accordingly, as depicted for example in FIG. 2, homopolar leakage flux paths 114 generated by the operation of the first axial magnetic bearing 100a often extend to other components or devices of a system or device. Such leakage flux can therefore cause electromagnetic interference (EMI) for other relatively close-by electromagnetic devices, which can negatively affect the operation of those affected parts, such as, for example, sensors 116 and other magnetic bearings or actuators 118. Additionally, for at least high speed electric motors, the areas that such leakage flux can be carried can be relatively wide if housing parts, such as, for example, a motor, generator, and/or bearing housings, are constructed from ferromagnetic material. Accordingly, the anticipated occurrence of leakage flux can lead to a restriction in the material that is generally suitable for selection for various housing parts that will generally surround, or otherwise be in relative close proximity to, the axial magnetic bearings. Further, homopolar leakage flux can magnetize parts of the system that are not intended to be magnetized, such as, for example, magnetize a shaft end, which can, among other concerns, facilitate the accumulation of dirt and relatively small, iron-containing particles on or around the magnetized part.

BRIEF SUMMARY

An aspect of an embodiment of the present application is an apparatus that includes an axial bearing core, at least a portion of the axial bearing core comprising a ferromagnetic material. The apparatus also includes a primary winding coupled to the axial bearing core, the primary winding having a plurality of first windings arranged to have a first number of turns. Additionally, the plurality of windings is further arranged for a flow of a current through the primary winding in a first direction. The apparatus also has a compensation winding that is coupled to the axial bearing core. The compensation winding can have a plurality of second windings that are arranged to have a second number of turns, the second number of turns being about one-half the number of turns as the first number of turns. Further, the compensation winding is arranged for a flow of a current through the compensation winding in a second direction, the second direction being opposite of the first direction.

Another aspect of an embodiment of the present application is an apparatus that includes a first axial magnetic bearing having a first stator core, a first primary winding, and at least one first compensation winding, the at least one first compensation winding having a number of turns that is at least equal to a number of turns of the first primary winding. The apparatus further includes a second axial magnetic bearing having a second stator core, a second primary winding, and at least one second compensation winding, the at least one second compensation winding having a number of turns that is at least equal to a number of turns of the second primary winding. The apparatus further includes a main rotor, the main rotor providing a flux return path for the flow of magnetic flux generated by at least the first and second primary windings. Additionally, the apparatus may not include a thrust plate.

A further aspect of an embodiment of the present application is a method that includes delivering a first electrical current to a first primary winding a first axial magnetic bearing. The delivered first electrical current can flow in a first direction through the primary winding. A second electrical current can be delivered to one or more first compensation windings of the first axial magnetic bearing. Further, the delivered second current can flow through the one or more first compensation windings in a second direction that is opposite of the first direction. Additionally, a third electrical current can be delivered to one or more second compensation windings of the second axial magnetic bearing. Further, the delivered third current can flow through the one or more second compensation windings in the second direction. The method can also include delivering a fourth electrical current to a second primary winding of a second axial magnetic bearing. The fourth electrical current can flow in the second direction. Further, the first and second axial magnetic bearings can be positioned on opposite sides of a rotable device, at least one of the first and fourth electrical currents including a biasing current. The method can also include compensating, through operation of the one or more first and second compensation windings, a magneto-motive force generated by the first and second primary windings to produce a net magneto-motive force of around zero ampere turns.

BRIEF DESCRIPTION OF THE DRAWINGS

The description herein makes reference to the accompanying figures wherein like reference numerals refer to like parts throughout the several views.

Figure 1:
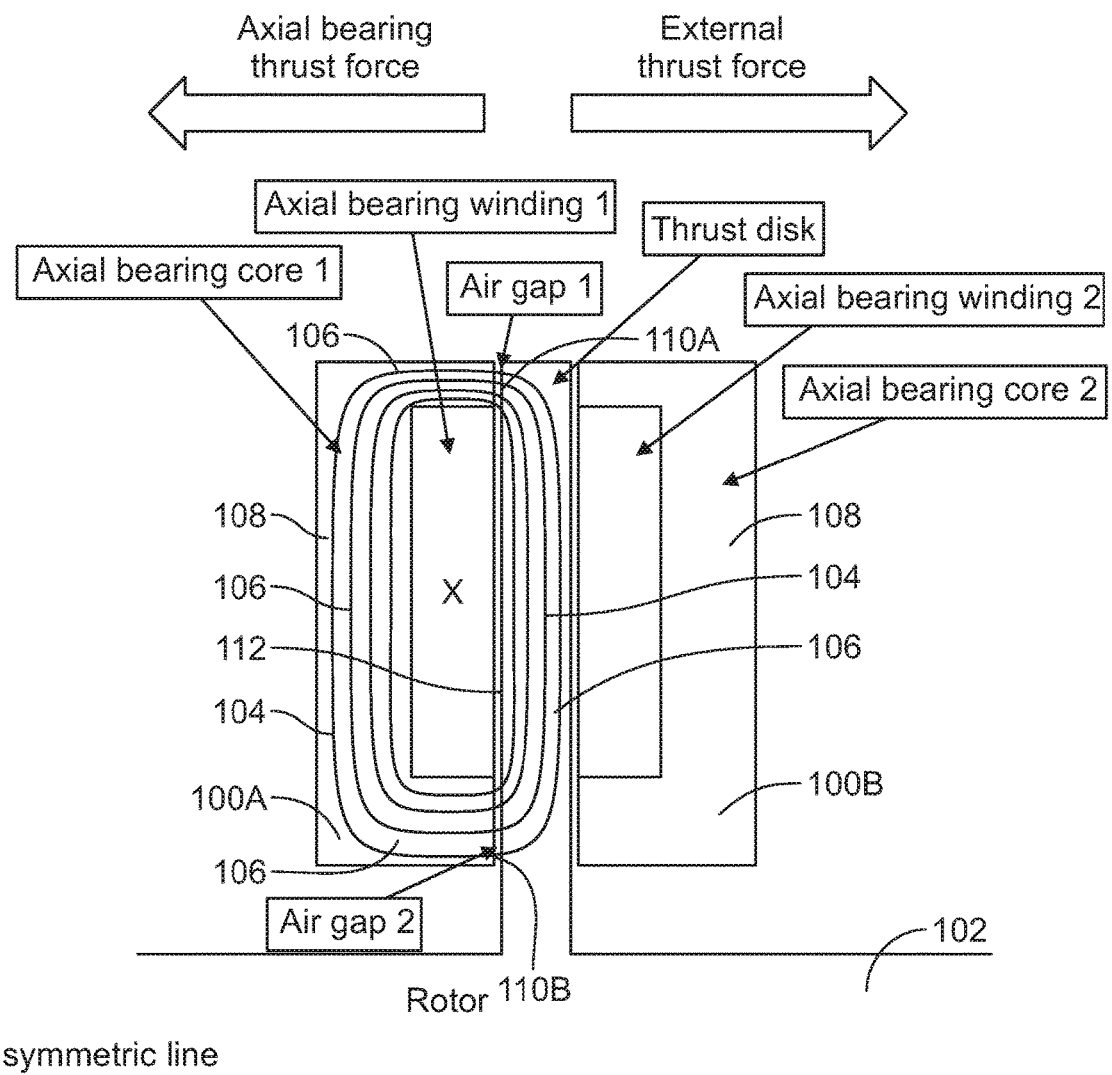
FIG. 1 illustrates a generally ideal case in which all of the magnetic flux generated by the operation of a first axial magnetic bearing flows along a main flux path.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

Figure 3:
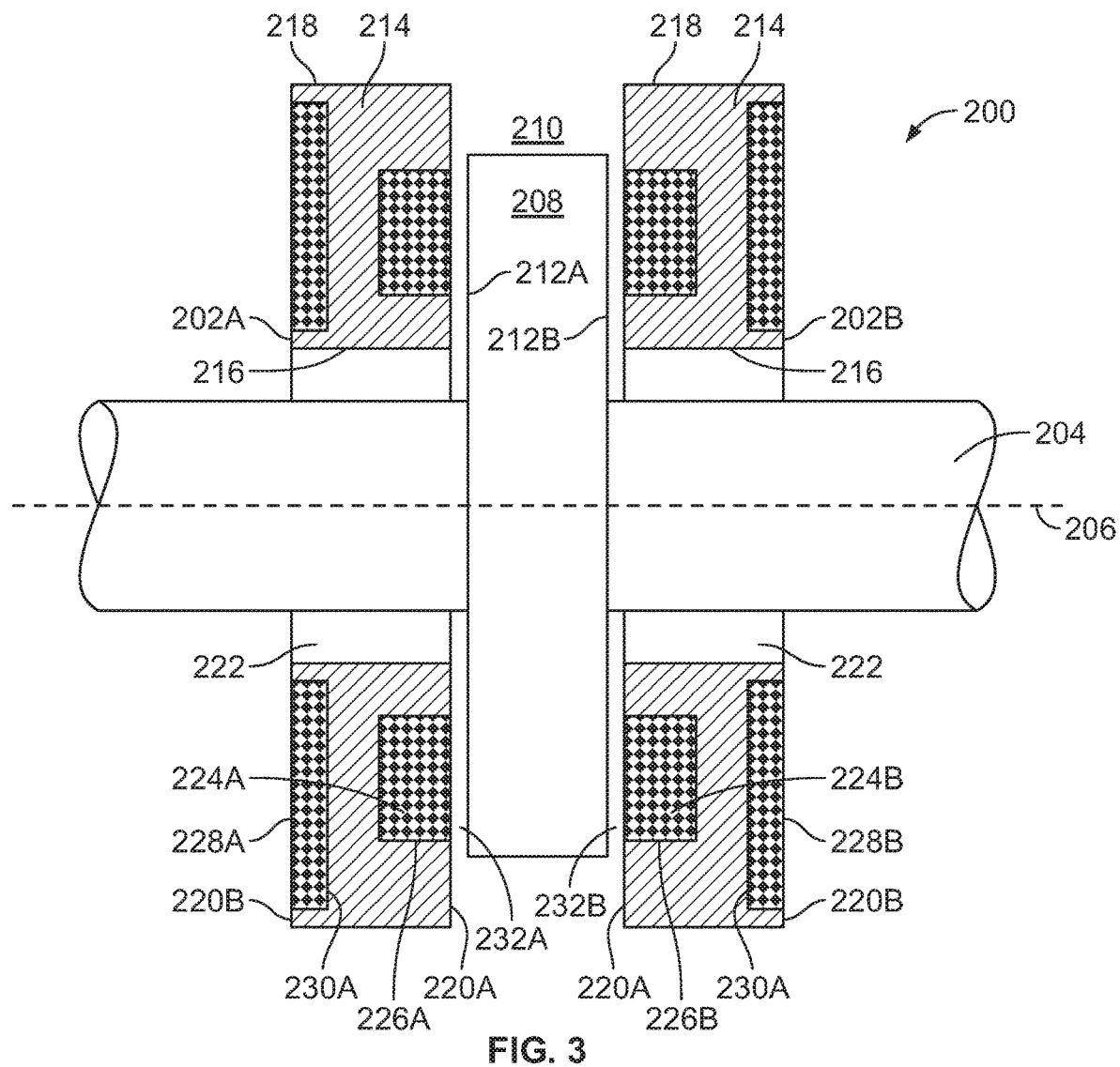
FIG. 3 illustrates a partial cross-sectional view of at least a portion of a magnetic bearing system that includes first and second axial magnetic bearings that are positioned about a rotable device and which include integrated compensation windings.

FIG. 3 illustrates a partial cross-sectional view of at least a portion of a magnetic bearing system 200 that includes first and second axial magnetic bearings 202a, 202b that are positioned about a portion of a rotable device 204, such as, for example, about a portion of a shaft or rotor of an electric motor or generator, among other devices. The rotable device 204 can be constructed for rotational displacement about a central axis of rotation 206 of the rotable device 204. According to the depicted example, the rotable device 204 includes, or is coupled to, a disk or plate 208 that extends into a space 210 between the first and second axial magnetic bearings 202a, 202b. Further, according to the illustrated embodiment, the disk or plate 208 generally extends radially outwardly from the rotable device 204 such that the opposing first and second side faces 212a, 212b of the disk or plate 208 are generally perpendicular to the central axis of rotation 206 of the rotable device 204. Further, according to certain embodiments, the disk or plate 208 is a thrust plate for which the first and second axial magnetic bearings 202a, 202b provide bearing for in one or more thrust directions that are generally parallel to the central axis of rotation 206 of the rotable device 204. Accordingly, the disk or plate 208 can be constructed from a ferromagnetic material or other magnetic material such that the disk or plate 208 can be attracted by magnetic forces that can be generated by the operation of the first and/or second axial magnetic bearings 202a, 202b. Further, the exemplary thrust disk or plate 208 may have a variety of different shapes and/or sizes. For example, while the thrust disk or plate 208 shown in FIG. 3 is depicted as generally not being aligned with the upper portion of the stator, such as, for example, a tooth portion of the stator, according to other embodiments, the thrust disk or plate 208 may have a smaller or larger diameter, including, for example, an extended diameter that generally aligns an outer portion of the thrust disk or plate 208 with tooth portion of the stator, as shown, for example, in FIG. 4.

The first and second axial magnetic bearings 202a, 202b each include an axial bearing core 214, which can be a stator core comprising at least a ferromagnetic material. The axial core bearing 214 can have an inner wall 216, an outer wall 218, and opposing first and second sides 220a, 220b. The inner wall 216 generally defines an aperture 222 that is sized to at least accommodate rotational displacement of an adjacent portion of the rotable device 204 that may extend through the aperture 222, while the outer wall 218 generally defines an outer periphery of the axial bearing core 214. Further, according to certain embodiments, the outer wall 218 can be configured to at least assist in relatively securely coupling the axial bearing core 214 to an adjacent structure, such as, for example, a motor, generator, or bearing housing, among other structures. Additionally, the inner and outer walls 216, 218 may each have a variety of similar or dissimilar shapes. For example, according to certain embodiments, both the inner and outer walls 216, 218 may be generally circular in cross-sectional shape such that the axial bearing cores 214 of the first and second axial magnetic bearings 202a, 202b are generally axisymmetric structures, such as, for example, ring shaped, among other shaped structures.

The first and second axial magnetic bearings 202a, 202b each further include a primary winding or electromagnetic coil 224a, 224b. The primary winding 224a, 224b may be configured to at least assist in the generation of a force that provides a magnetic bearing for the rotable device 204 in a thrust direction that is generally parallel to the axis of rotation. According to certain embodiments, the primary winding 224a, 224b comprises a plurality of number of turns wounded from an electrically conductive material, such as, for example, but not limited to, copper wire. Further, the plurality of windings for the primary winding 224a, 224b may generally be configured such that, when the rotable device 204 operably extends through the aperture 222 of the axial bearing core 214, the plurality of windings of the primary windings 224a, 224b are generally symmetrical about at least the axis of rotation 206 of the rotable device 204. The number of turns ($N_{PW}$) of the plurality of windings of the primary windings 224a, 224b may depend on a variety of different factors, including, for example, the strength of the magneto-motive force that is to be generated by operation of the respective first or second axial magnetic bearing 202a, 202b. Moreover, the magneto-motive force (MMF) generated by the operation of the first or second axial magnetic bearing 202a, 202b can generally be the product of the number of turns ($N_{PW}$) of the primary and the current (I) flowing inside of the primary winding 224a, 224b, which can be represented as:

$$MMF = (N_{PW})I \quad \text{(Eq. 1)}$$

According to certain embodiments, the axial bearing core 214 of the first and second axial magnetic bearings 202a, 202b may each include a primary coil slot 226a, 226b that extends into the axial bearing core 214 from one of the first and second sides 220a, 220b of the axial bearing core 214. The primary coil slot 226a, 226b can be sized to house at least a portion of the primary winding 224a, 224b, as depicted in FIG. 3. For example, according to certain embodiments, the primary coil slot 226a, 226b may be sized such that the primary coil slot 226a, 226b does not, or relatively minimally, outwardly extends beyond the adjacent first or second side 220a, 220b of the axial bearing core 214.

The first and second axial magnetic bearings 202a, 202b each further include one or more compensation windings 228a, 228b. The compensation winding(s) 228a, 228b may be configured to, when operably subjected to an electrical current, at least assist in generating a magneto-motive force that reduces and/or minimizes homopolar magnetic flux leakage, as discussed below. Moreover, the compensation winding(s) 228a, 228b may be configured and/or operated such that the net MMF of the bearing system 200 is, or is around, zero. Moreover, the compensation winding(s) 228a, 228b may be configured and/or operated such that the net MMF generated by the flow of current through the first and/or second primary windings 224a, 224b is zero. As discussed below in more detail, depending on the circumstances and/or configuration of the bearing system 200, current may simultaneously flow through either or both of the first and second primary windings 224a, 224b. Further, as also discussed below, according to certain embodiments, the compensation winding(s) 228a, 228b may be configured such that each compensation winding 228a, 228b compensates for the MMF generated by the primary winding 224a, 224b of the bearing 202a, 202b associated with that compensation winding 228, 228b, respectively, or the compensation windings 228a, 228b operate together to both compensate for the net MMF generated by both the first and second primary windings 224a, 224b, such that the net MMF of the bearing system 200 is, or is about, zero.

Similar to the primary winding 224a, 224b, the compensation windings 228a, 228b comprises a plurality of number of turns wounded from an electrically conductive material, such as, for example, but not limited to, copper windings. Additionally, the windings for the compensation winding(s) 228a, 228b may generally be configured such that, when the rotable device 204 operably extends through the aperture 222 of the axial bearing core 214, the compensation winding(s) 228a, 228b are generally symmetrical about the axis of rotation 206 of the rotable device 204.

The number of turns ($N_{CW}$) for the compensation winding(s) 228a, 228b may depend on a variety of different factors, including, for example, the strength of the magneto-motive force that is anticipated to be separately generated by each of the primary windings 224a, 224b. According to certain embodiments, the compensation winding(s) 228a for first magnetic bearing 202a has one-half the number of turns ($N_{CW1}$) as the number of turns ($N_{PW1}$) of the primary winding 224a of the first magnetic bearing 202a. Similarly, according to certain embodiments, the compensation winding(s) 228b for second axial magnetic bearing 202b has one-half of the number of turns ($N_{CW2}$) as the number of turns as the number of turns ($N_{PW2}$) as the primary winding 224b of the second axial magnetic bearing 202b. Accordingly, when the number of turns ($N_{PW1}$) of the primary winding 224a of the first magnetic bearing 202a is the same as the number of turns ($N_{PW2}$) of the primary winding 224b of the second axial magnetic bearing 202b, then:

$$N_{PW1} = N_{CW1} + N_{CW2} \quad \text{(Eq. 2)}$$

$$N_{PW2} = N_{CW1} + N_{CW2} \quad \text{(Eq. 3)}$$

Figure 4:
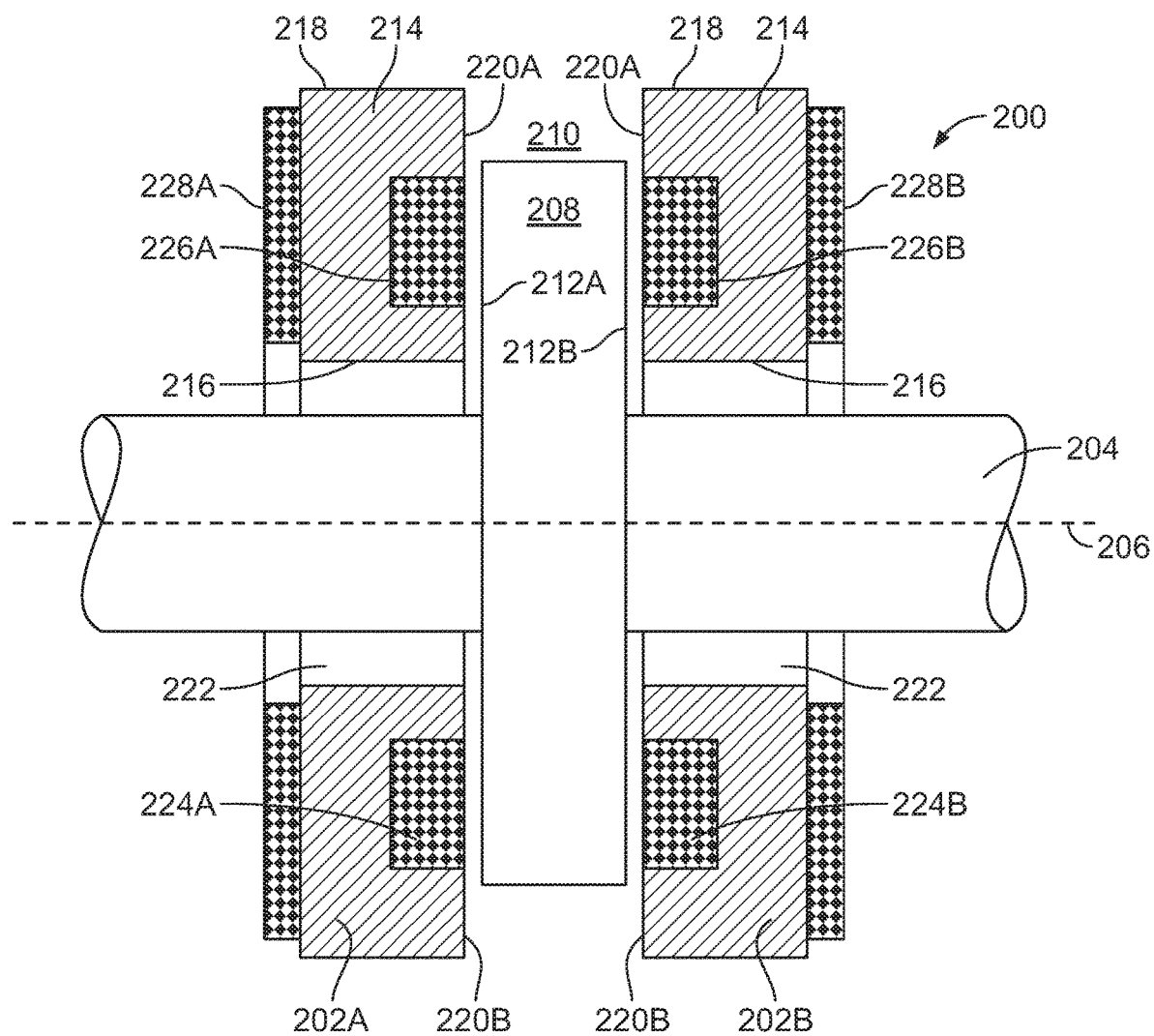
FIG. 4 illustrates a partial cross-sectional view of at least a portion of a magnetic bearing system that includes first and second axial magnetic bearings that are positioned about a rotable device and which include compensation windings that are not integrated into the first and second axial magnetic bearings.

Referencing FIGS. 3 and 4, one or more of the compensation windings 228a, 228b can be separate from the first and second axial magnetic bearings 202a, 202b, and/or can be integrated in the axial bearing core 214 of the first and second axial magnetic bearings 202a, 202b. For example, as illustrated by FIG. 4, according to certain embodiments, at least one compensation windings 228a, 228b can be positioned against or in relatively close proximity to a side 220a, 220b of, and external to, the axial bearing core 214 of the of the first and second axial magnetic bearings 202a, 202b that is opposite of the side 220a, 220b to which the primary winding 224a, 224b is positioned. Moreover, for example, according to certain embodiments, a compensation winding 228a, 228b may be external to the second side 220b of the axial bearing core 214 of the first and second axial magnetic bearings 202a, 202b, while the primary winding 224a, 224b is adjacent to the first side 220a, including positioned in the primary coil slot 226a, 226b, among other positions internal or external to the axial bearing core 214. Alternatively, as shown in FIG. 3, according to other embodiments, the compensation winding 228a, 228b can be positioned in a compensation coil slot 230a, 230b that extends into the axial bearing core 214 from one of the first and second sides 220a, 220b of the axial bearing core 214. The compensation coil slot 230a, 230b can, according to certain embodiments, be sized to house at least a portion of the compensation windings 228a, 228b, as depicted in FIG. 3. For example, according to certain embodiments, the compensation coil slot 230a, 230b may be sized such that the compensation winding 228a, 228b does not, or relatively minimally, outwardly extends beyond the adjacent first or second side 220a, 220b of the axial bearing core 214.

Additionally, the compensation windings 228a, 228b may, or may not, have a size, configuration, and/or position that is generally similar to that of the primary winding 224a, 224b. Further, the compensation windings 228a, 228b may be positioned at a variety of locations relative to the axial bearing core 214. For example, as shown in FIG. 4, according to certain embodiments, the compensation coil slot 230a, 230b, and thus the compensation windings 228a, 228b, may extend into closer proximity to the inner and outer walls 216, 218 of the first and second axial magnetic bearings 202a, 202b than the primary coil slot 226a, 226b and the associated primary winding 224a, 224b.

Figure 5:
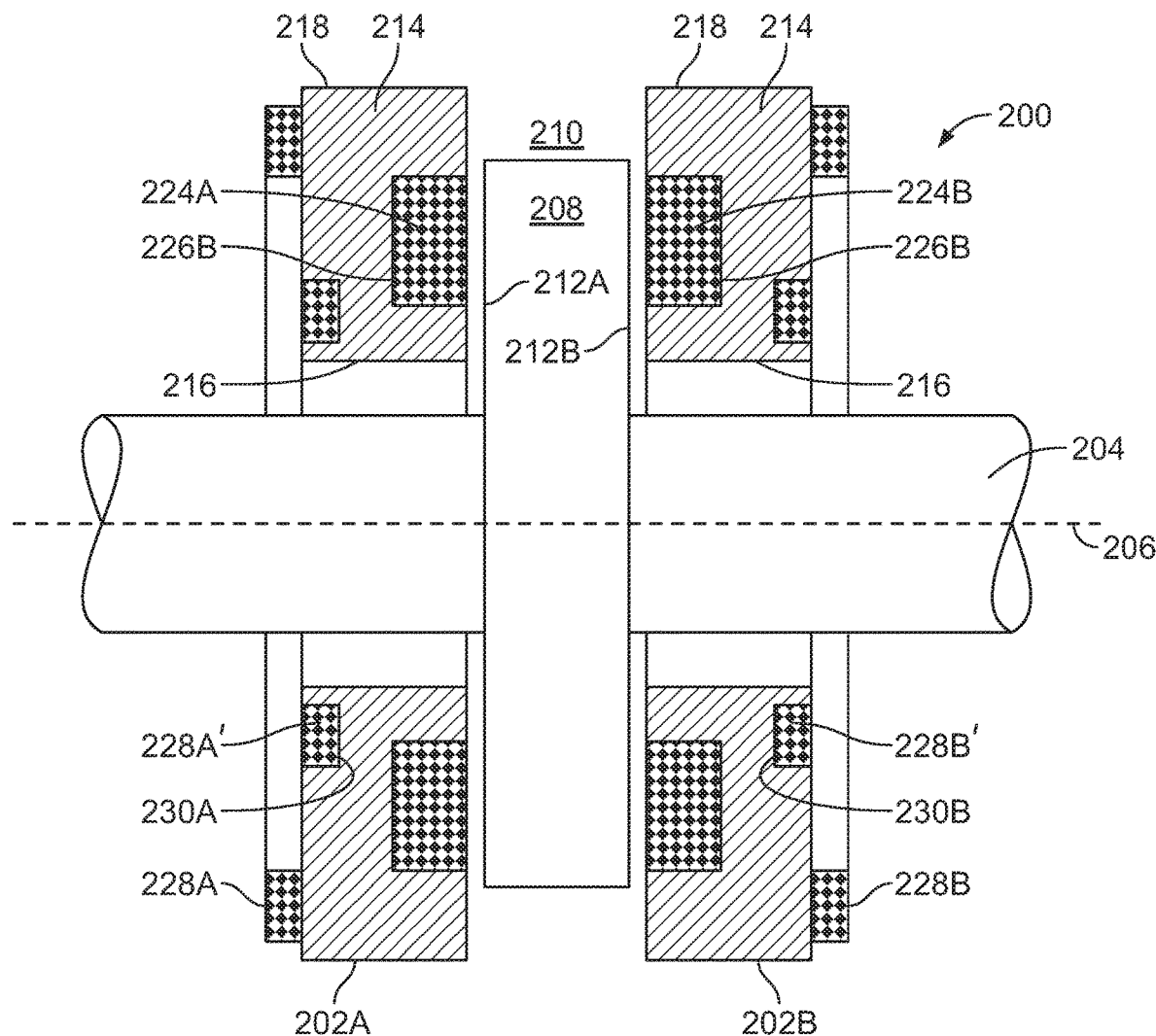
FIG. 5 illustrates a partial cross-sectional view of at least a portion of a magnetic bearing system that includes first and second axial magnetic bearings that are positioned about a rotable device and which both include integrated and non-integrated compensation windings.

Although FIGS. 3 and 4 depict each of the first and second axial magnetic bearings 202a, 202b having one compensation winding 228a, 228b, one or more of the first and second axial magnetic bearings 202a, 202b may have a plurality of compensation windings 228a, 228a', 228b, 228b' as shown, for example, by FIG. 5. According to such embodiments, at least a portion of the compensation windings 228a, 228a', 228b, 228b' may, or may not, overlap and/or be intertwined. For example, according to certain embodiments, at least one of the first and second axial magnetic bearings 202a, 202b may have a first compensation winding 228a, 228b and a second compensation winding 228a', 228b', the first compensation winding 228a, 228b radially extending around the associated first and/or second axial magnetic bearing 202a, 202b at a location that is further from the access of rotation 206 than the second compensation winding 228a', 228b'. Additionally, according to certain embodiments, the first and/or second axial magnetic bearing 202a, 202b can have at least a first compensation winding 228a, 228b that is external to, or separate from, the axial bearing core 214, and at least a second compensation winding 228a', 228b' that is housed within a compensation coil slot 230a, 230b in the corresponding first or second axial magnetic bearing 202a, 202b. Further, according to certain embodiments, for a given axial magnetic bearing 202a, 202b having a first compensation winding 228a, 228b having a number of turns ($N_{CWA}$), and a second compensation winding 228a', 228b' having a number of turns ($N_{CWB}$), the sum of the total number turns ($N_{CWA}+N_{CWB}$) of the one or more compensation windings 228a, 228b, 228a', 228b' may remain equal to half of the total number of turns ($N_{PW}$) of the primary winding 224a, 224b for that particular axial magnetic bearing 202a, 202b such that:

$$(N_{CWA}+N_{CWB})=N_{PW}/2 \qquad \text{(Eq. 4)}$$

During use, one of the first and second axial magnetic bearings 202a, 202b is positioned adjacent to the first side face 212a of the disk or plate 208, and the other of first and second axial magnetic bearings 202a, 202b is positioned adjacent to the second side face 212b of the disk or plate 208. Further, the first and second axial magnetic bearings 202a, 202b are positioned in relative close proximity to the adjacent first or second side faces 212a, 212b of the disk or plate 208. For example, according to the example illustrated in FIG. 3, the first magnetic bearing 202a may be positioned in relatively close proximity to the first side face 212a of the disk or plate 208 such that the first side 220a of the first magnetic bearing 202a is separated from the first side face 212a by a first air gap 232a. Similarly, the second axial magnetic bearing 202b may be positioned in relatively close proximity to the second side face 212b of the disk or plate 208 such that the first side 220a of the second axial magnetic bearing 202b is separated from the second side face 212b by a second air gap 232b. The first and second air gaps 232a, 232b can be relatively narrow in width, such as, for example, having, but not limited to, widths of about 0.2 millimeters (mm) to about 1.5 mm. However the widths of such air gaps 232a, 232b can vary based on applications, and can be smaller then, or larger then, this exemplary range. Further, the first and second axial magnetic bearings 202a, 202b may be oriented in opposite orientations such that the primary winding 224a, 224b for each of the first and second axial magnetic bearings 202a, 202b are inwardly positioned toward the adjacent first or second side face 212a, 212b of the disk or plate 208, as shown, for example, by at least FIGS. 3-5.

When operated, electrical current can flow through the primary winding 224a, 224b of one of the first or second axial magnetic bearings 202a, 202b in a first direction, while electrical current flows through the one or more compensation windings 228a, 228b of both of the axial magnetic bearings 202a, 202b in a second direction, the second direction being opposite of the first direction. Moreover, according to the certain embodiments, current through the compensation windings 228a, 228b may generally flow in one, and only one, direction. Similarly, according to such embodiments, current through the primary windings 224a, 224b may generally flow in one, and only one, direction that is opposite to the direction that current is flowing through the compensation winding(s) 228a, 228b. For example, electrical current may flow through the primary winding 224a, 224b in one of a clockwise or counter-clockwise direction, while electrical current flows through the compensation winding(s) 228a, 228b in the other of the clockwise and counter-clockwise directions. Additionally, the current for the primary winding 224a, 224b and compensation winding(s) 228a, 228b may be provided from the same, or different, power sources. For example, according to certain embodiments, the primary winding 224a, 224b and the one or more compensation windings 228a, 228b can be all connected in series to a common current source, or can be supplied with power from separate current sources.

Thus, for a given primary winding 224a, 224b, such as, for example, the primary winding 224a of the first magnetic bearing 202a, the number of turns ($N_{PW1}$) of the primary winding 224a is equal to the sum total number of turns of the compensation windings 228a, 228b of the first and second axial magnetic bearings 202a, 202b, as indicated by the application of above Equation 1. Accordingly, as current can be controlled to only flow in one of the first and second axial magnetic bearings 202a, 202b at a particular time, and flows in a direction that is opposite of the direction that current flows through the compensation windings 228a, 228b of both the first and second axial magnetic bearing 202a 202b, the net magneto-motive force (MMF) generated from the primary winding 224a and the compensation windings 228a, 228b is generally zero. For example, if current (I) is flowing through the primary winding 224a of the first magnetic bearing 202a to work against an opposing external thrust force, current may not be flowing through the primary winding 224b of the second axial magnetic bearing 202b. In such an example, the magneto-motive force ($MMF_2$) provided by the primary winding 224b of the second axial magnetic bearing 202b can be zero. If, however, the first axial magnetic bearing has an winding having 100 turns (N=100), referencing above equation 1 (Eq. 1), the magneto-motive force ($MMF_1$) provided by current flowing through the primary winding 224a of a first magnetic bearing 202a can be represented as MMF=100(I). In such an example, referencing above-equation 2, the compensation windings 228a of the first magnetic bearing 202a can have a sum total of 50 turns, and the compensation windings 228b of the second axial magnetic bearing 202b may also have a sum total of 50 turns. Further, as the current is flowing in the compensation windings 228a, 228b of the first and second axial magnetic bearings 202a, 202b in a direction that is opposite to the direction that current flows through the primary winding 224a of the first magnetic bearing 202a, the current flowing through the compensation windings 228a, 228b can be represented as a negative current (e.g., −I). Accordingly, in such an example, the magneto-motive force ($MMF_1$) provided by current flowing through the compensation winding 228a of the first magnetic bearing 202a can be represented as −50(I), and the MMF provided by current flowing through the compensation winding 228b of the second axial magnetic bearing 202b can be represented as −50(I). In such an example, the sum of the MMF of the first axial magnetic bearing 202a (100(I)), the compensation winding 228a of the first axial magnetic bearing (−50(I)), and the compensation winding 228b of the second axial magnetic bearing (−50(I)) is generally zero.

Figure 2:
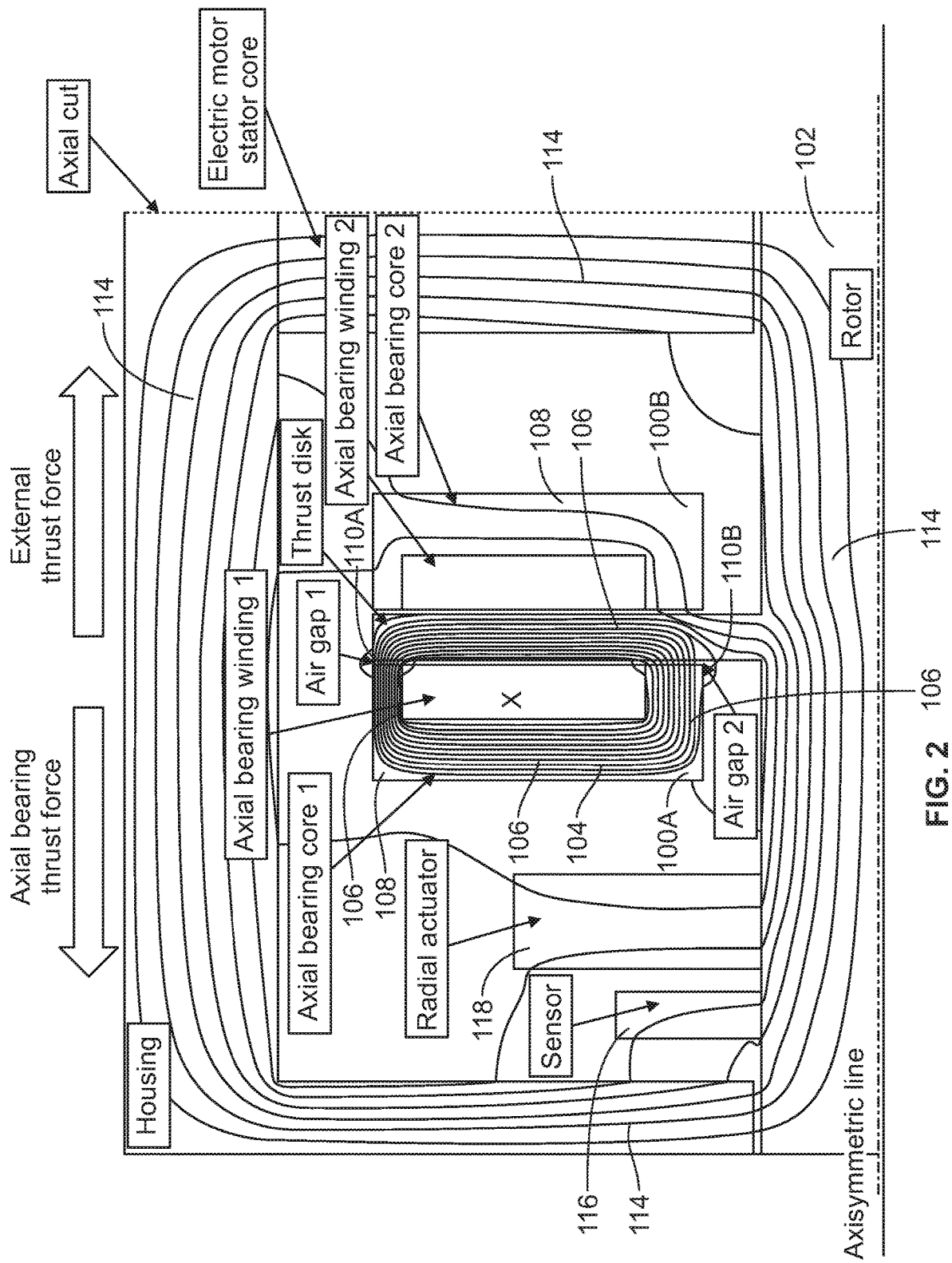
FIG. 2 illustrates an example of homoplanar leakage flux paths generated by the operation of the first axial magnetic bearing of FIG. 1 extending away from the main flux path and to other components or devices of a system or an apparatus.
Figure 6:
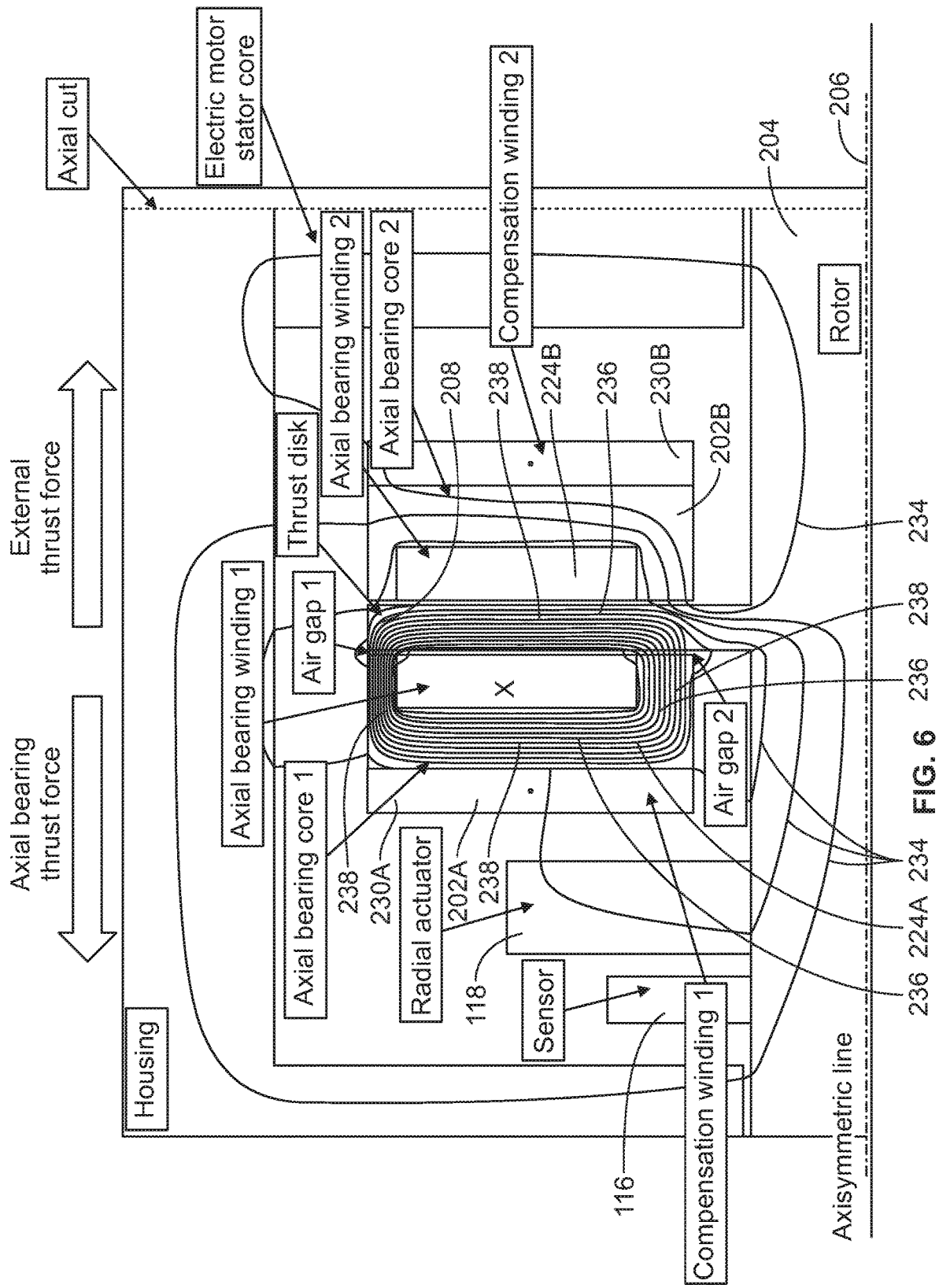
FIG. 6 illustrates an example of a reduction, when compared to at least FIG. 2, of homoplanar leakage flux paths generated by the operation of axial magnetic bearings that each include one or more compensation windings.

FIG. 6 represents an exemplary scenario similar to that illustrated in FIG. 2 but in which the first and second axial magnetic bearings 202a, 202b include compensation windings 228a, 228b along the second sides 220b of the first and second axial magnetic bearings 202a, 202b. As shown, when compared to FIG. 2, the inclusion of compensation windings 228a, 228b can result in a net magneto-motive force (MMF) of around zero, which can have a relatively positive impact on reducing homopolar-leakage flux 234. Further, such reduction in homopolar-leakage flux 234 can result in an improvement of the quantity and/or density of magnetic flux 236 along the main flux path 238, which can thereby result in an elevation of the bearing load capacity of the first and second axial magnetic bearings 202a, 202b. Moreover, by elevating the quantity and/or density of magnetic flux that flows along the main flux path 238, the use of axial magnetic bearings 202a, 202b that include the above-discussed one or more compensation windings 228a, 228b may at least assist in facilitating an increase in load capacity of the axial magnetic bearings 202a, 202b. Thus, by using the compensation windings 228a, 228b to assist in increasing the quantity and/or density of magnetic flux that flows along the main flux path 238, an enhanced degree of thrust force may be attained with the same amount of magneto-motive force.

Additionally, the inclusion of one or more compensation windings 228a, 228b to the axial magnetic bearings 202a, 202b may prevent and/or minimize the negative effects of the homopolar-leakage of magnetic flux that can otherwise be associated with axial magnetic bearings 202a, 202b in which current flows only in one direction. Further, by decreasing, if not generally eliminating, homopolar-leakage magnetic flux by the inclusion of one or more compensation windings 228a, 228b to each of the axial magnetic bearings 202a, 202b may at least assist in reducing, if not eliminating, the degree to which the operation of the axial magnetic bearings 202a, 202b generates electromagnetic interference for other relatively nearby electromagnetic components, such as, for example, other actuators, sensors, and/or an electric motor, among other components. Additionally, by maintaining a relatively high degree or density of main flux along the main flux path, the total inductance of the primary winding 224a, 224b may be reduced, which can improve the dynamical capability of the associated axial magnetic bearing 202a, 202b. Further, reducing, or eliminating the homopolar leakage of magnetic flux may reduce concerns relating to the materials of adjacent components extending the path of travel of the leakage flux. Accordingly, the reduction, or elimination, of homopolar leakage may enhance the degree of freedom in the selection of materials that can be used for adjacent parts or components, including, for example, the option of using ferromagnetic iron for a housing of an associated electrical motor, generator, and/or bearing. Further, enhancing the ability to retain a larger amount or density of magnetic flux along the main flux path may reduce the potential of other components or parts becoming inappropriately magnetized, and thereby reduce or eliminate potential adverse side effects of such magnetization, including, for example, the attraction and associated accumulation of debris, including dirt and metallic particles, that can be harmful to the operation of the associated system, device, or component.

While examples are discussed above in terms of a first current flowing through either the first or the second primary winding 224a, 224b, while little or no current flows through the other of the first and second primary windings 224a, 224b, embodiments of the present application can also be used in situations or configurations in which current flows through both the first and the second primary windings 224a, 224b. For example, according to certain embodiments, a first current can flow the first axial magnetic bearing 202a, a second current can flow through one or more first compensation windings 228a, 228a", a third current can flow through a one or more second compensation windings 228b, 228b', and a fourth current can flow through the second axial magnetic bearing 202b. Additionally, in certain situations, the first or the fourth current that flows through the first or second primary winding 224a, 224b, respectively, can be a biasing current. Further, which of the first and fourth currents is a biasing current can vary or alternate based on a number of circumstances. Such biasing current may be used to at least assist in linearizing the bearing force behavior capacity, as well as improve the speed of the associated bearing(s) 202a, 202b.

For example, referencing the bearing system 200 shown in FIG. 3, a situation may arise in which the bearing system 200 experiences a thrust force generally in the right direction, e.g. in a direction generally away from the first axial magnetic bearing 202a and generally toward the second axial magnetic bearing 202b. In certain situations, the thrust force may have an amplitude that the left side bearing, in this example, first axial magnetic bearing 202a, may attempt to balance. For example, the primary winding 224a of the first axial magnetic bearing 202a may utilize, for purposes of illustration, a 1 amp (A) control current (Ic). Further, a bias current (Ibias) may flow through the primary windings 224a, 224b of the first and second axial magnetic bearings 202a, 202b, which, in this example can be 3 amps (A). In such an example, the current of the first primary winding 224a may be the sum of the control current (Ic) and the bias current (ibias), which can be expressed as Ibias-Ic (e.g., 3 A+1 A=4 A), while the current of the second primary winding 224b can be expressed as Ibias-Ic (e.g., 3 A-1 A=2 A). Further, in such a situation, the current flowing through the first primary winding 224a can be in a direction that is opposite of that of the flow of current through the second primary winding 224b. Thus, in such an example, if the first and second primary windings 224a, 224b each have 100 turns, the net MMF of the first and second primary windings 224a, 224b would be 4 A*100N+(-2 A)*100N, or 200 ampere turns.

Compensation for the first and second primary windings 224a, 224b such that the total MMF of the bearing system 200, which includes the compensation windings 228a, 228a', 228b, 228b', is zero ampere turns can be achieved in a variety of manners. For example, according to certain situations, the first compensation winding(s) 228a, 228a' can have a total of 100 turns, and the second compensation winding(s) 228b, 228b' can also have 100 turns. According to such a configuration, compensation for the MMF of the first and second primary windings 224a, 224b can be performed separately per side of the bearing system 200. For example, according to certain embodiments, the first compensation winding(s) 228a, 228a' can receive a -4 amp current, and the second compensation winding(s) 228b, 228b' can receive a +2 amp current. In such a situation, the first compensation winding 228a, 228a' can compensate for the MMF of the first primary winding 224a such that the net MMF of the first primary winding 224a and the first compensation winding(s) 228a, 228a' is, or is around, zero. Similarly, the second compensation winding 228b, 228b' can separately compensate for the MMF of the second primary winding 224b, such that the net MMF of the second primary winding 224b and the second compensation winding(s) 228b, 228b' is, or is about, zero.

According to another embodiment, rather than having the first and second compensation windings 228a, 228a', 228b, 228b' separately compensate for the MMF of their associated primary winding 224a, 224b, the first and second compensation windings 228a, 228a', 228b, 228b' can, together, both compensate for the total MMF of both the first and second primary windings 224a, 224b. For example, in the above example, the MMF of the first primary winding 224a is 400 ampere turns, while the MMF of the second primary winding 224b is -200 ampere turns. In such a situation, as discussed above, the first compensation winding(s) 228a, 228a' and the second compensation winding 228b, 228b' can each have a number of turns that is one-half the number of turns of the first primary winding 224a, and/or is one-half the number of turns of the second primary winding 224b. For example, following the previously discussed example in which the first and second primary windings 224a, 224b each had 100 turns, the first compensation winding(s) 228a, 228a' may have a total of 50 turns, and the second compensation winding(s) 228b, 228b' may also have a total of 50 turns. Accordingly, in such an example in which the total MMF of the first and second primary windings 224a, 224b is 200 amps (A), a 2 amp (A) current in an opposite direction, which in this example is a direction that is opposite of the flow of current through the first primary winding 224a, and can therefore be referred to as -2 A, can flow through each of the first and second compensation winding 228a, 228a', 228b, 228b'. In such an example, a -2 A current to the 50 turn first compensation winding 228a, 228a' will provide a -100 ampere turns, and similarly a -2 A current to the 50 turn second compensation winding 228b, 228b'' will also provide a -100 ampere turns for a total of -200 ampere turns. Thus, in this example, the total MMF or -200 ampere turns for the compensation windings and the total MMF of 200 ampere for the first and second primary windings 224a, 224b can result in a net MMF for the system 200 of, or around, 0 ampere turns.

Additionally, according to at least certain embodiments in which the first and second compensation windings 228a, 228a', 228b, 228b' both compensate together for the total MMF that is about equal to, but opposite of, the total MMF of both the first and second primary windings 224a, 224b, the first and second compensation windings 228a, 228a', 228b, 228b' may not be connected in series with the first and second primary windings 224a, 224b. Further, such an embodiment may be configured to include certain power electronics, such as, for example, an H-bridge configuration wherein the number of power amplifiers is increased compared to other situations that may utilize a half bridge connection, and wherein current may flow in only one direction.

Figure 7:
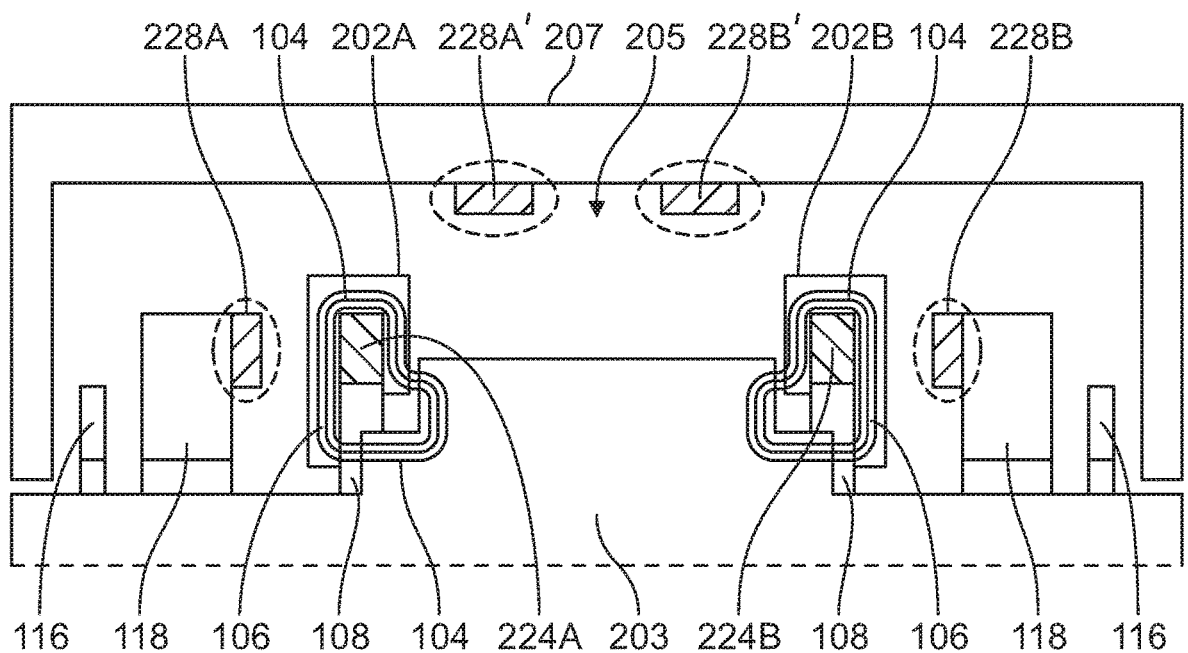
FIG. 7 illustrates a bearing system having first and second pairs of compensation windings, each of which is external to the associated main axial bearing core, and wherein, in the absence of a thrust disk, a main rotor is also a main flux return path.

Additionally, according to certain embodiments, the magnetic bearing system 200 may not include or utilize a thrust disk or plate, such as, for example, not include the disk or plate 208 that is depicted in FIG. 3. According to such embodiments, the main rotor 203 of the electrical device 205 may be utilized as a flux return path for the axial bearings 202a, 202b. For example, FIG. 7 depicts an electrical device 205 having a housing 207 wherein both the first compensation winding 228a, 228a' and the second compensation winding 228b, 228b' are both divided in two parts. Such divided compensation windings 228a, 228a', 228b, 228b' can be presented in both the first and second stages of the electrical device 205. Further, according to certain embodiments, the sections of the first compensation windings 228a, 228a' can be in series with, and wound in a direction that is opposite of, the first primary winding 224a. Similarly, the second compensation windings 228b, 228b' can be in series with, and wound in a direction that is opposite of the direction of, the second primary winding 224b. Further, according to certain embodiments, the first compensation windings 228a, 228a' can each have a total number of turns that is one-half the total number of turns of the first primary winding 224a such that the combined net total number of turns for the first compensation windings equals the number of turns of the first primary winding 224a. Further, according to certain embodiments, the second compensation windings 228b, 228b' can each have a total number of turns that is one-half the total number of turns of the second primary winding 224b such that the combined total number of turns of the second compensation windings 228b, 228b' is about equal to the number of turns of the second primary winding 224b. Additionally, according to certain embodiments, as depicted in FIG. 7, the first and second compensation windings 228a, 228a', 228b, 228b' can be external to the associated axial bearing core 108. As demonstrated by the magnetic flux 104 and associated main magnetic flux path in FIG. 7, according to such embodiments in which the electrical device 205 does not include a thrust disk or plate 208, the main rotor 203 of the electrical device 205 may be utilized as a flux return path for the axial bearings 202a, 202b.

Figure 8:
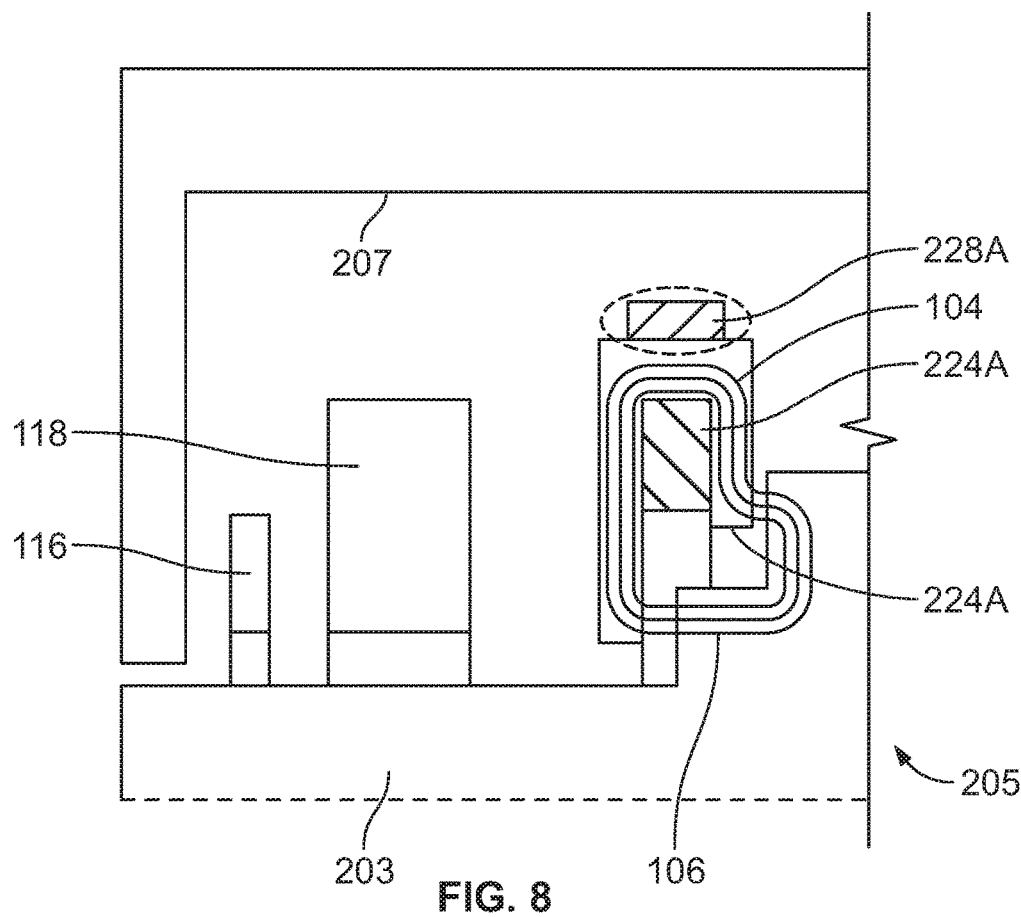
FIG. 8 illustrates a bearing system having first and second compensation windings that are each integrated in the associated main axial bearing core, and wherein, in the absence of a thrust disk, a main rotor is also a main flux return path.

FIG. 8 illustrates another embodiment of a magnetic bearing system 200 in which the electrical device 205 does not include a thrust disk or plate 208. According to the embodiment shown in FIG. 8, the first compensation windings 228a, as well as the second compensation winding 228b (not shown), are integrated in the associated axial bearing core 108. Additionally, as indicated, each of the first and second compensation windings 228a, 228b can each comprise one set of windings. The number of turns for each of the compensation windings 228a, 228b can vary. For example, according to certain embodiments, the first compensation winding 228a can have a number of turns that is less then, such as, for example, one-half, or, alternatively, equal to, the number of turns of the first primary winding 224a. Similarly, the second compensation winding 228b can have a number of turns that is less then, such as, for example, one-half, or, alternatively, equal to the number of turns of the second primary winding 224b. Additionally, at least for those embodiments in which the number of turns for each of the first and second compensation windings 228a, 228b is equal to the number of turns of the corresponding first and second primary windings 224a, 224b, the compensation windings 228a, 228b may be connected in series to, and wound in the opposite direction of, the corresponding first and second primary windings 224a, 224b. Further, again, as shown by the magnetic flux 104 and associated main magnetic flux path in FIG. 8, according to such embodiments in which the electrical device 205 does not include a thrust disk or plate 208, the main rotor 203 of the electrical device 205 may again be utilized as part of the flux return path for the axial bearings 202a, 202b.

Additionally, according to certain embodiments, the ratio of electrical power delivered to the first and second axial magnetic bearings 202a, 202b can be based on at least attempting to axially displacing the rotor 203 in a particular direction. For example, according to certain embodiments, the system 200 can include one or more separate position sensors 116 that sense at least the axial position of the rotor 203. Further, the first and second axial magnetic bearings 202a, 202b can receive a supply of current, as determined for example by using a position and current control algorithm, that is to both levitate the rotor 203 as well as axially maintain the levitated rotor 203 at a central reference position. In the event that the rotor 203 is axially displaced away from the central reference position, such as in one of opposing first and second axial directions, the movement of the rotor 203 can be sensed by the one or more sensors 116. In such a situation, the position and current control algorithm can calculate a current, or ratio of current, that, when delivered to the first and second axial magnetic bearings 202a, 202b, can at least assist in returning the axially displaced rotor 203 back toward and/or to the central reference position.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. An apparatus comprising:
an axial bearing core, at least a portion of the axial bearing core comprising a ferromagnetic material;
a primary winding coupled to the axial bearing core, the primary winding having a plurality of first windings each arranged to have a first number of turns, the plurality of first windings further arranged for a flow of a current through the primary winding in a first direction; and
a plurality of compensation windings coupled to the axial bearing core including a plurality of second windings arranged to have a sum total of a second number of turns, the second number of turns being one-half the number of turns of the first number of turns, the plurality of second windings further arranged for a flow of a current through the plurality of second windings in a second direction, the second direction being opposite of the first direction.

2. The apparatus of claim 1, comprising: a main rotor, the main rotor providing a flux return path for the flow of magnetic flux generated by the primary winding, and wherein the apparatus does not include a thrust plate.

3. The apparatus of claim 1, wherein at least one of the plurality of compensation windings is external to the axial bearing core.

4. The apparatus of claim 3, wherein at least one of the plurality of compensation windings is integral to the axial bearing core.

5. The apparatus of claim 1, wherein the axial bearing core includes a first side and a second side, and wherein the primary winding is at least adjacent to the first side and at least one of the plurality of compensation windings is positioned adjacent to the second side.

6. An apparatus comprising:
an axial bearing core, at least a portion of the axial bearing core comprising a ferromagnetic material;
a primary winding coupled to the axial bearing core, the primary winding having a plurality of first windings arranged to have a first number of turns, the plurality of windings further arranged for a flow of a current through the primary winding in a first direction; and
a plurality of compensation windings arranged for a flow of a current through the compensation winding in a second direction, the second direction being opposite of the first direction, the plurality of compensation windings including a first winding and a second winding, the first winding being external to the axial bearing core and radially extending around the axial bearing core at a location farther from an axis of rotation than the second winding but closer to the axis of rotation than a side of the axial bearing core, the second winding being internal to the axial bearing core, housed within a slot of the axial bearing core.

7. The apparatus of claim 6, comprising: a main rotor, the main rotor providing a flux return path for the flow of magnetic flux generated by the primary winding, and wherein the apparatus does not include a thrust plate.

8. The apparatus of claim 6, wherein at least one of the plurality of compensation windings is external to the axial bearing core.

9. The apparatus of claim 6, wherein the axial bearing core includes a first side and a second side, and wherein the primary winding is at least adjacent to the first side and at least one of the plurality of compensation windings is positioned adjacent to the second side.

* * * * *